Figure 1:
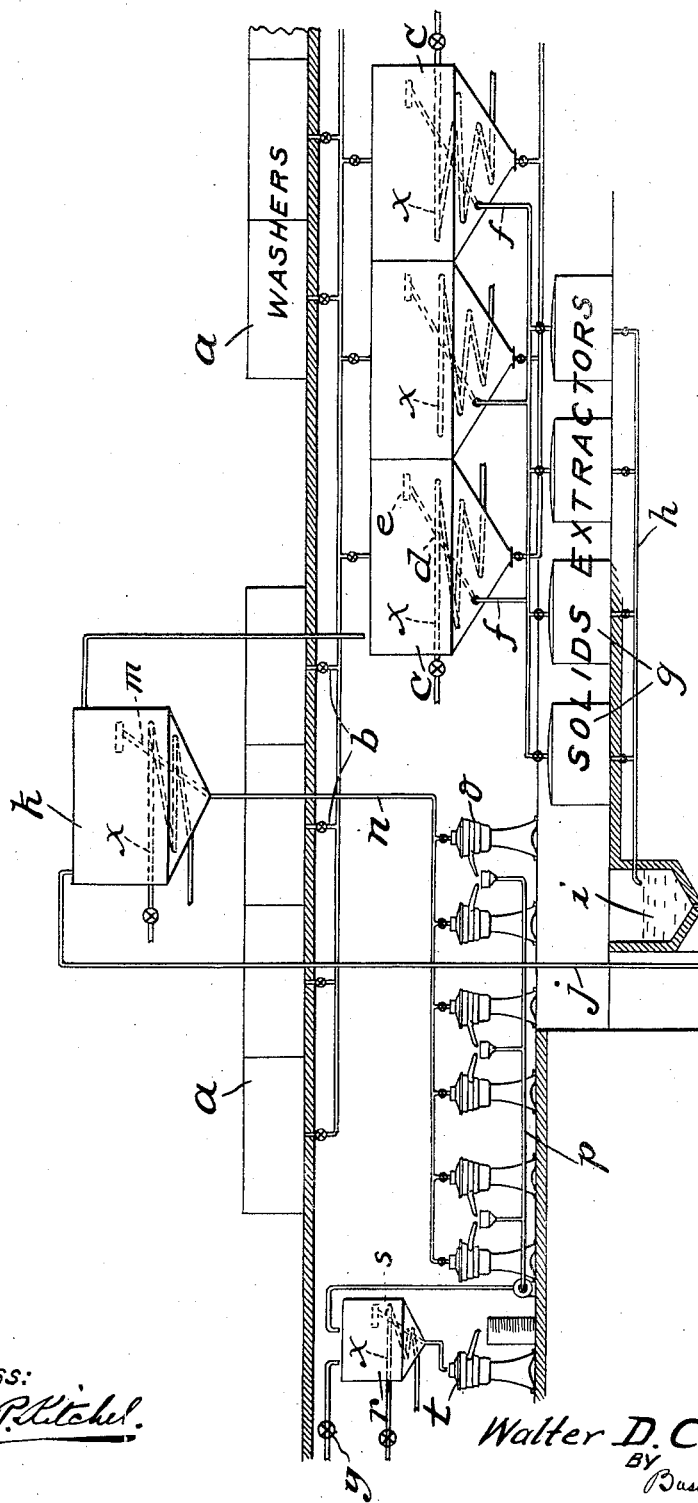

June 17, 1930.  W. D. CLEARY  1,764,390
PROCESS OF RECOVERING GREASE FROM GARBAGE
Filed Nov. 19, 1926  2 Sheets-Sheet 1

INVENTOR
Walter D. Cleary
BY
Busser and Harding
ATTORNEYS.

June 17, 1930.  W. D. CLEARY  1,764,390
PROCESS OF RECOVERING GREASE FROM GARBAGE
Filed Nov. 19, 1926  2 Sheets-Sheet 2

WITNESS:

INVENTOR
Walter D. Cleary
BY
ATTORNEYS.

Patented June 17, 1930

1,764,390

UNITED STATES PATENT OFFICE

WALTER D. CLEARY, OF BROOKLYN, NEW YORK, ASSIGNOR TO THE DE LAVAL SEPARATOR COMPANY, OF NEW YORK, N. Y., A CORPORATION OF NEW JERSEY

PROCESS OF RECOVERING GREASE FROM GARBAGE

Application filed November 19, 1926. Serial No. 149,325.

The object of my invention is to recover grease or oil from garbage and like materials with which it may be intimately associated and to recover it in a relatively pure condition so that it will not contain more, and preferably will contain much less, than two per cent of solids and water. Another object of the invention is to so thoroughly eliminate oil or grease from the liquid constituent of the original mixture, that such liquid constitutent, almost wholly water, may be emptied into a running stream or other body of water without polluting it.

My process is not dependent for its operation on the particular apparatus shown, although the same has been found efficiently operative when in use on a large commercial scale and possesses special advantages.

The figure is a view, in side elevation, somewhat diagrammatic, of a plant in which the process is adapted to be carried out: the apparatus being intended more particularly for the extraction of grease from garbage.

The garbage from the digesters 10 passes through roll presses 11, which disintegrate the solids and squeeze out the liquids; the solids being conveyed, by means of a conveyor 12, to driers 13, while the expelled liquor flows out pipes 14 into a catch basin 15. It is impossible by known methods to recover the grease from this liquor in a relatively pure state. The recovered grease contains so high a percentage of water and solids that it cannot satisfy exacting requirements and must be disposed of at a relatively low price.

In the complete apparatus illustrated, the liquor from the catch basin, which should be heated to about 180° F. (if it has cooled much below that temperature) in order to render the greases sufficiently fluid, is continuously fed to a centrifuge 16 of the basket type, wherein the liquid constituent is separated from the bulk of the solids, comprising dirt, sediment, etc. The separated solids are retained in the basket of the centrifuge, from which they are removed and transferred to the driers for conversion into fertilizer.

The liquor discharged from the centrifuge is continuously fed to a holding tank 17, which is preferably of the cone-bottom type and which is equipped with a float feed device or skimmer 18 through which the lighter constituent of the liquor, comprising all the grease and some of the water, is continuously withdrawn. The holding tank may be equipped with heating coils, or may be heated in any other convenient way, in order to maintain the liquor at the desired temperature of about 180° F.

The greasy water, which may contain a small proportion of insoluble matters, is continuously transferred, by means of the float feed device 18, to one or more centrifugal purifiers or separators 19, wherein there is a separation of the grease from the water and solids. It is preferred not to rely upon a single separation in order to effect the final separation, and to so adjust the outlets from the separators that all the grease, with some water, and possibly also some of the lightest of the solids, will escape from the light liquid discharge outlet, most of the water and solids escaping from the heavy liquid discharge outlet. The lighter separated liquid, containing all the grease, may be fed direct to another separator or battery of separators 22; a stream of warm, clean water being fed, at the same time through pipe 23, to separators 22, wherein the final separation of the grease from the water is effected. It is desirable, in some cases, to feed the grease and water from separators 19 to a holding tank 20 which, like holding tank 17, is equipped with a float feed device 21, by means of which liquid, comprising all the grease and some water, is skimmed from the top and then conveyed to the final separators 22. In this case the pipe 23 would lead to tank 20, as shown in the drawing.

To more specifically illustrate the operation of the process, let it be assumed that the process of extracting grease from garbage is practiced. The material coming from the catch basin to the centrifugal solids extractor may comprise (as an example) 80% of water with some dissolved salts, 17% of solids and 3% of grease. Nearly all the solids are removed in the solids extractor. The material going to the holding tank may comprise (say) 96% of water, less than 4% of grease and a small fraction of one per cent of solids. In the centrifugal separator 19, the water may be almost entirely separated from the grease. A little grease may be lost with the water. The process may be stopped here. If it is desired to save the last fraction of grease, the centrifugal separator 19 is adjusted to deliver grease containing about 3% of water. The final separation of grease from this water and from the water admitted through pipe 23 occurs in separator 22.

In the last described process I have used a centrifugal solids extractor having a capacity, rotating at 850 R. P. M., of over a thousand gallons per hour; a centrifugal separator or skimmer 17, rotating at 6000 R. P. M. and having a capacity of one thousand gallons per hour; and a final separator, acting as a purifier, rotating at the same speed as separator 17 and having a capacity of one hundred gallons per hour.

The use of the final separator 22 is optional.

The heat advisable, if not absolutely required, for the process, is obtained from the same source that supplies the heat for the various steps of the reduction process. The expense of operation is, therefore, negligible. The process results in the extraction of a large proportion of grease that was heretofore lost, in the production of a grease which may be refined by inexpensive processes and made suitable for all operations for which a high grade grease is necessary, and in the saving of solids heretofore lost and their use in the production of fertilizer. The water constituent of the liquor, being deprived of its grease and solids contents, may be diverted to a running stream or any public body of water, and such water will not be polluted as heretofore. It may also be stated that the grease, being deprived of its bacilla-forming solids, will keep for a long time without spoiling.

It will be noted that the process, after digestion, roll pressing and settling in the catch basin, comprises, of necessity, two, and, optionally, three centrifugal operations, all of which are of a different character. In the first centrifugal process, the solids are almost completely extracted from the water and grease. In the second centrifugal process the grease, with a little water, is separated from the great bulk of the water and any very small fraction of unseparated solids. In the third (optional) centrifugal process, water is added in order to provide a mixture containing a sufficient proportion of water to so dilute the impurities that they may be thoroughly washed out. If the separator 19 is adjusted to deliver pure grease, some grease will be lost with the water, since no ideal separation of two liquids is possible, and the grease may not be entirely free of solids. By diluting and washing the grease with water, it is recovered, in separator 22, practically pure, and free of solids.

Where, in the claims, I specify grease, I mean to include grease, oil, or any greasy or oily substance which has a lower specific gravity than the water or other liquid with which it is associated and whose recovery in a purified state is desired.

While it is believed that any type of basket centrifuge, particularly those with imperforate sides, can be successfully used to carry out the main solids separating step of the process, it may be stated that it is highly desirable that it be fitted with horizontal wings or vanes to permit of the even building of the cake against the sides of the basket and to prevent slippage of the basket around the liquid and solids. To facilitate the removal of bigger solids from the basket, it is desirable, also, to equip it with a bottom discharge or hopper permitting the solids, when scraped from the sides, to fall onto a conveyor or other suitable apparatus for disposal.

Having now fully described my invention, what I claim and desire to protect by Letters Patent is:

The process of extracting grease from the impure liquor expressed from digested garbage and containing grease, water and unseparated solids, which comprises settling out a proportion of the solids, subjecting the impure liquor, while at a temperature sufficiently high to render it sufficiently fluid, to centrifugal force to effect the separation of the major part of the remaining solids from impure liquor containing the grease and water and a minor part of the solids, skimming off the grease with some water from the centrifugally separated impure liquor, and subjecting the skimmed-off liquor to centrifugal force and thereby separating from the grease the water and any solids that have not been eliminated in the previous operations.

In testimony of which invention, I have hereunto set my hand, at city of New York, on this 15th day of November, 1926.

WALTER D. CLEARY.

CERTIFICATE OF CORRECTION.

Patent No. 1,764,390.  Granted June 17, 1930, to

WALTER D. CLEARY.

It is hereby certified that error appears in the printed specification of the above numbered patent requiring correction as follows: Page 1, after line 91, insert In the drawing, heating coils x are shown extending into the catch basin 15 and holding tanks 17 and 20.

Figure 2:
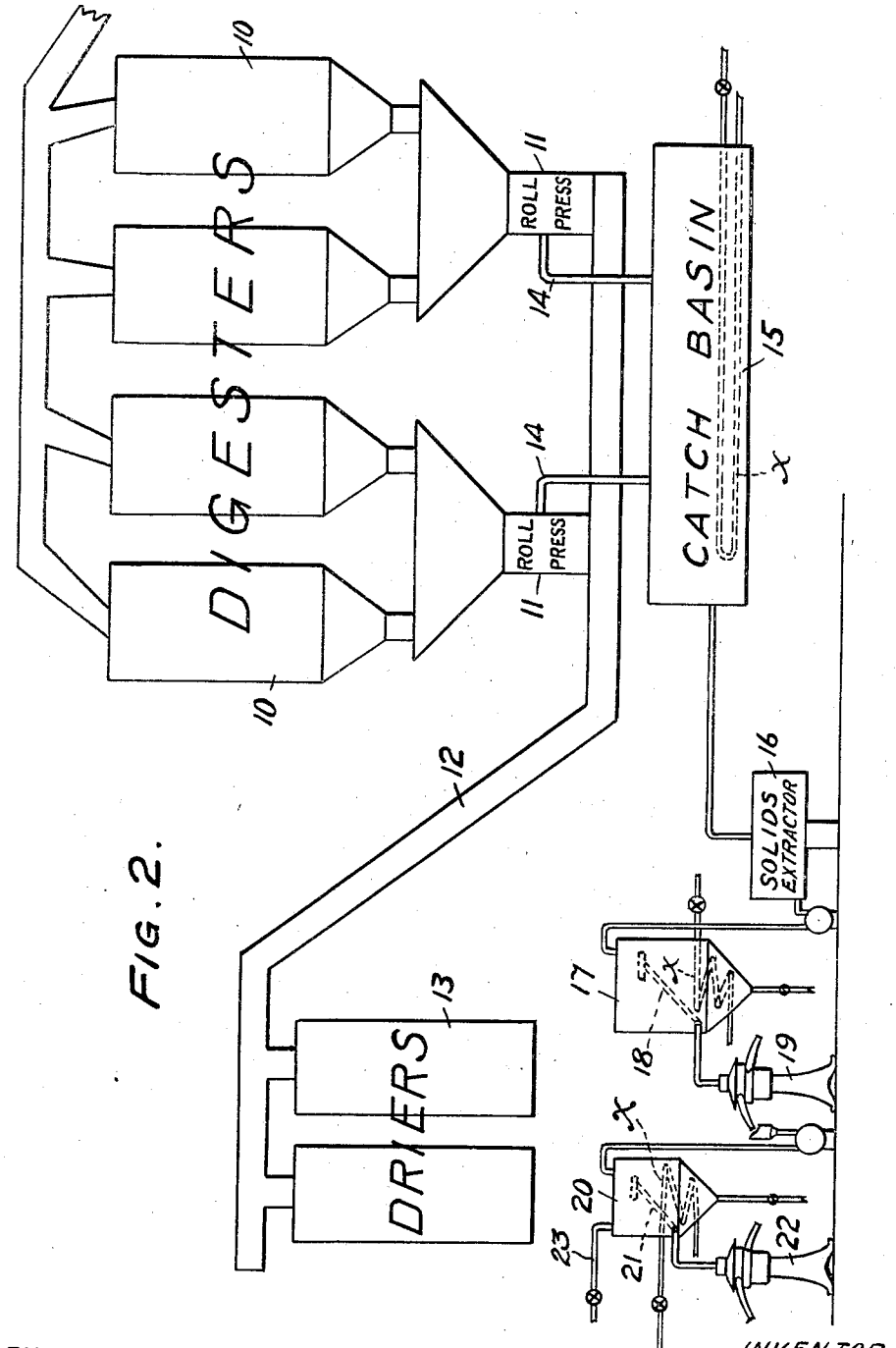

In the drawings, cancel Sheet 1 containing Figure 1; Sheet 2, strike out the words "Sheet 2, and the number Fig. 2" in Figure 2; and that the said Letters Patent should be read with these corrections therein that the same may conform to the record of the case in the Patent Office.

Signed and sealed this 19th day of August, A. D. 1930.

(Seal)

M. J. Moore,
Acting Commissioner of Patents.